(12) United States Patent
Tanaka et al.

(10) Patent No.: US 8,710,117 B2
(45) Date of Patent: Apr. 29, 2014

(54) CROSSLINKED CORE/SHELL POLYMER PARTICLES

(75) Inventors: Nobushige Tanaka, Wakayama (JP);
Takehiro Tsutsumi, Wakayama (JP);
Koji Azuma, Wakayama (JP)

(73) Assignee: Kao Corporation, Tokyo (JP)

( * ) Notice: Subject to any disclaimer, the term of this patent is extended or adjusted under 35 U.S.C. 154(b) by 508 days.

(21) Appl. No.: 12/981,171

(22) Filed: Dec. 29, 2010

(65) Prior Publication Data

US 2011/0092637 A1    Apr. 21, 2011

Related U.S. Application Data

(62) Division of application No. 11/898,075, filed on Sep. 7, 2007, now abandoned.

(30) Foreign Application Priority Data

Sep. 8, 2006 (JP) .................................. 244821/2006

(51) Int. Cl.
*C09D 11/10* (2006.01)

(52) U.S. Cl.
USPC ......................................... 523/160; 523/161

(58) Field of Classification Search
USPC .................................................. 523/160, 161
See application file for complete search history.

(56) References Cited

U.S. PATENT DOCUMENTS

| | | | |
|---|---|---|---|
| 5,713,989 A | 2/1998 | Wickramanayake et al. | |
| 5,852,074 A | 12/1998 | Tsutsumi et al. | |
| 5,990,202 A | 11/1999 | Nguyen et al. | |
| 2003/0008942 A1* | 1/2003 | Ninomiya et al. | 523/160 |
| 2004/0024086 A1 | 2/2004 | Segawa et al. | |
| 2004/0176498 A1 | 9/2004 | Ando et al. | |
| 2008/0026221 A1* | 1/2008 | Vincent et al. | 428/407 |

FOREIGN PATENT DOCUMENTS

| | | |
|---|---|---|
| EP | 1041127 A1 | 10/2000 |
| EP | 1435380 A1 | 7/2004 |
| EP | WO 2006/034230 A1 | 3/2006 |
| JP | 9-286939 A | 11/1997 |
| JP | 2002-12802 A | 1/2002 |
| JP | 2003-206430 A | 7/2003 |
| JP | 2003-520279 A | 7/2003 |
| JP | 2003-308620 A | 10/2003 |
| JP | 2004-67903 A | 3/2004 |
| JP | 2004-269558 A | 9/2004 |

OTHER PUBLICATIONS

Office Action in Chinese Application No. 200710149223.4 mailed Aug. 31, 2011, including an English translation.
Chinese Office Action for Application No. 200710149223.4 dated Apr. 28, 2011.

* cited by examiner

*Primary Examiner* — Doris Lee
(74) *Attorney, Agent, or Firm* — Birch, Stewart, Kolasch & Birch, LLP

(57) ABSTRACT

The present invention relates to crosslinked core/shell polymer particles containing a pigment which are usable in a water-based ink for ink-jet printing and exhibit excellent optical density and gloss and are prevented from suffering from occurrence of bronzing, wherein the polymer particles each include a core portion and a shell portion which are respectively made of a crosslinked polymer, and a weight ratio of the pigment to the pigment-containing crosslinked core/shell polymer particles [(weight of the pigment/weight of the pigment-containing crosslinked core/shell polymer particles)× 100] is from 25 to 75. The present invention further relates to a water dispersion and a water-based ink for ink-jet printing which contain the crosslinked core/shell polymer particles and a process for producing crosslinked polymer particles.

11 Claims, No Drawings

CROSSLINKED CORE/SHELL POLYMER PARTICLES

CROSS REFERENCE PARAGRAPH TO RELATED APPLICATION

This application is a Divisional of U.S. application Ser. No. 11/898,075, filed on Sep. 7, 2007 now abandoned, which claims the benefit of Japanese Application No. 2006-244821, filed on Sep. 8, 2006, both of which are hereby incorporated by reference as fully set forth herein.

FIELD OF THE INVENTION

The present invention relates to crosslinked core/shell polymer particles, water dispersions and water-based inks containing the crosslinked core/shell polymer particles and process for producing crosslinked polymer particles.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using plain paper as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate. However, when using a pigment as the colorant, the printed images and characters tend to suffer from bronzing by which a reflected light therefrom is observed as a color different from an inherent color of the pigment, depending upon an angular position of the observation. For example, a reflected light from a phthalocyanine-based pigment contained in cyan inks exhibits a reddish color, resulting in considerable deterioration in quality of the resultant images. Meanwhile, details of the "bronzing" are described in "Handbook for Science of Colors", Publishing Association of Tokyo University, p. 777.

In order to improve the bronzing, there have been proposed the ink composition containing a polyether-modified polysiloxane and a sulfone group-containing (co)polymer emulsion (JP 2003-306620A), the ink containing a polycyclic aromatic hetero-conjugated compound (JP 2004-67903A), etc. However, in these conventional techniques, there tends to occur such a risk that printed images or characters are adversely affected by changing additives and pigments added thereto.

On the other hand, there are known water dispersions and water-based inks containing colored fine particles having a core/shell structure. For example, in order to improve a durability of the water dispersions and water-based inks, there has been proposed the ink obtained by capsulating a colorant combined with a primer core/shell polymer, with a durable core/shell polymer (JP 2003-520279A); in order to improve a peel resistance of images obtained after printing, there has been proposed the ink containing colored resin particles composed of a core made of at least a colorant and a thermoplastic resin, and a shell made of a resin having a three-dimensional crosslinked structure, in a capsulated emulsion condition (JP 2002-12802A); in order to improve an ejection stability and a light resistance, there has been proposed the water dispersion containing colored fine particles as a core which contain two or more resins and a colorant (JP 2003-206430A); and in order to improve a solvent resistance, there has been proposed the dispersion of colored fine particles having a two or more-layered core/shell structure in which two or more of the cores and shell layers have a crosslinked structure (JP 2004-269558A). However, these water dispersions and water-based inks as well as the additives therefor have failed to be improved in bronzing.

SUMMARY OF THE INVENTION

The present invention relates to crosslinked core/shell polymer particles containing a pigment, wherein the polymer particles each include a core portion and a shell portion which are respectively made of a crosslinked polymer, and a weight ratio of the pigment to the pigment-containing crosslinked core/shell polymer particles [(weight of the pigment/weight of the pigment-containing crosslinked core/shell polymer particles)×100] is from 25 to 75; a water dispersion containing the crosslinked core/shell polymer particles; a water-based ink for ink-jet printing which contains the water dispersion; and a process for producing crosslinked polymer particles.

DETAILED DESCRIPTION OF THE INVENTION

The present invention relates to crosslinked core/shell polymer particles which are usable in a water based ink for ink-jet printing, exhibit excellent optical density and gloss, and are prevented from suffering from occurrence of bronzing; a water dispersion and a water-based ink containing the crosslinked core/shell polymer particles; and a process for producing crosslinked polymer particles.

The present invention relates to the following aspects (1) to (5):

(1) Crosslinked core/shell polymer particles containing a pigment, wherein the polymer particles each include a core portion and a shell portion which are respectively made of a crosslinked polymer, and a weight ratio of the pigment to the pigment-containing crosslinked core/shell polymer particles [(weight of the pigment/weight of the pigment-containing crosslinked core/shell polymer particles)×100] is from 25 to 75.

(2) The crosslinked core/shell polymer particles according to the above aspect (1), wherein the crosslinked core/shell polymer particles are produced through the following steps (1) to (3):

Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;

Step (2): polymerizing the crosslinkable monomer with the hydrophobic monomer to obtain core/shell polymer particles having a crosslinked core portion; and Step (3): reacting the core/shell polymer particles having the crosslinked core portion which is obtained in the step (2), with a crosslinking agent containing at least two reactive functional groups other than the reactive unsaturated groups in a molecule thereof.

(3) A water dispersion including the crosslinked core/shell polymer particles as described in the above aspect (1) or (2).

(4) A water-based ink for ink-jet printing including the water dispersion as described in the above aspect (3).

(5) A process for producing crosslinked polymer particles containing a pigment, wherein a weight ratio of the pigment to the pigment-containing crosslinked polymer particles [(weight of the pigment/weight of the pigment-containing crosslinked polymer particles)×100] is from 25 to 75, includes the following steps (1) to (3):

Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;

Step (2): polymerizing the crosslinkable monomer with the hydrophobic monomer to obtain polymer particles; and Step (3): reacting the polymer particles which are obtained in the step (2), with a crosslinking agent containing at least two reactive functional groups in a molecule thereof.

The crosslinked core/shell polymer particles containing a pigment according to the present invention have such a structure in which a polymer forming the core portion and a polymer forming the shell portion are physically or chemically bonded to each other, and both the polymers are crosslinked. The polymer forming the core portion and the polymer forming the shell portion are different in kinds of constitutional units (kinds of monomers as raw materials) and/or weight ratio between the constitutional units (weight ratio between the monomers) from each other in view of not only crosslinking property but also other properties as required. More specifically, the polymer forming the core portion has a high affinity to pigments, whereas the polymer forming the shell portion has a function of stabilizing a water dispersion of the polymer particles.

The weight ratio of the pigment to the pigment-containing crosslinked core/shell polymer particles [(weight of the pigment/weight of the pigment-containing crosslinked core/shell polymer particles)×100] is from 25 to 75, preferably from 30 to 70 and more preferably from 40 to 65. When the weight ratio of the pigment to the pigment-containing crosslinked core/shell polymer particles lies within the above specified range, the water dispersion or water-based ink for ink-jet printing which contains the crosslinked core/shell polymer particles are excellent in optical density and gloss, and can be prevented from suffering from occurrence of bronzing. When the weight ratio of the pigment to the pigment-containing crosslinked core/shell polymer particles is less than 25, the resultant water dispersion or water-based ink tends to be insufficient in optical density and gloss. When the weight ratio of the pigment to the pigment-containing crosslinked core/shell polymer particles is more than 75, the resultant water dispersion or water-based ink tends to be insufficient in the effect of suppressing occurrence of bronzing.

The core portion of the core/shell polymer particles is preferably obtained by polymerizing a crosslinkable monomer containing at least two reactive unsaturated groups in a molecule thereof with a hydrophobic monomer (c).

Also, the shell portion of the core/shell polymer particles is preferably obtained by crosslinking a copolymer produced by copolymerizing a monomer mixture containing a salt-forming group-containing monomer (a) and a macromer (b), and/or the hydrophobic monomer (c), with a crosslinking agent containing at least two reactive functional groups other than the reactive unsaturated groups in a molecule thereof.

The crosslinking degree of the core portion of the crosslinked core/shell polymer particles which is represented by the following formula (1) is preferably from 0.5 to 15% by weight, more preferably from 0.7 to 13% by weight, still more preferably from 1.0 to 11% by weight and further still more preferably from 1.5 to 9% by weight in view of good optical density and gloss.

$$\text{Crosslinking Degree of Core Portion(\%)} = (\text{Amount of Crosslinkable Monomer}/\text{Amount of Polymer in Crosslinked Core portion}) \times 100 \quad (1)$$

In the above formula (1), the amount of the polymer in the crosslinked core portion means an amount of the crosslinked polymer, and the total amount (calculated value) of the crosslinkable monomer and the hydrophobic monomer.

The crosslinking degree of the shell portion of the crosslinked core/shell polymer particles which is represented by the following formula (2) is preferably from 0.5 to 15% by weight, more preferably from 0.7 to 13% by weight, still more preferably from 1.0 to 11% by weight and further still more preferably from 1.5 to 9% by weight in view of good optical density and gloss.

$$\text{Crosslinking Degree of Shell Portion(\%)} = (\text{Amount of Crosslinking Agent}/\text{Amount of Polymer in Shell portion}) \times 100 \quad (2)$$

In the above formula (2), the amount of the polymer in the shell portion means an amount of the polymer before subjected to crosslinking reaction, and does not include an amount of the crosslinking agent.

The process for producing the crosslinked core/shell polymer particles of the present invention is not particularly limited. However, the crosslinked core/shell polymer particles are efficiently produced by the process including the following steps (1) to (3):

Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;

Step (2): polymerizing the crosslinkable monomer with the hydrophobic monomer to obtain core/shell polymer particles having a crosslinked core portion; and Step (3): reacting the core/shell polymer particles having the crosslinked core portion which is obtained in the step (2), with a crosslinking agent containing at least two reactive functional groups in a molecule thereof.

Moreover, the present invention relates to the following process for producing crosslinked polymer particles.

A process for producing crosslinked polymer particles containing a pigment, wherein a weight ratio of the pigment to the pigment-containing crosslinked polymer particles [(weight of the pigment/weight of the pigment-containing crosslinked polymer particles)×100] is from 25 to 75, includes the following steps (1) to (3):

Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;

Step (2): polymerizing the crosslinkable monomer with the hydrophobic monomer to obtain polymer particles; and Step (3): reacting the polymer particles which are obtained in the step (2), with a crosslinking agent containing at least two reactive functional groups in a molecule thereof.

The respective components, etc., are explained below.
(Pigment)

The pigment may be either inorganic or organic. The inorganic or organic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames C.I. Pigment Yellow, C.I. Pigment Red, C.I. Pigment Violet, C.I. Pigment Blue and C.I. Pigment Green, etc., with various product numbers. Examples of the extender pigment include silica, calcium carbonate and talc.

Among these pigments, in view of enhancing the effect of reducing occurrence of bronzing, preferred are cyan pigments, more preferred are phthalocyanine pigments, still more preferred are copper phthalocyanine pigments, and further still more preferred is at least one copper phthalocyanine pigment selected from the group consisting of C.I. Pigment Blue 15, 15:1, 15:2, 15:3, 15:4, 16 and 60. These pigments may be used alone or in the form of a mixture of any optional two or more thereof.

(Polymer)

The polymer used in the present invention is preferably a water-insoluble polymer. Here, the "water-insoluble polymer" means a polymer exhibiting a solubility in water of 10 g or lower, preferably 5 g or lower and more preferably 1 g or lower when the polymer is dried at 105° C. for 2 h, and then dissolved in 100 g of water at 25° C. In the case where the polymer has a salt-forming group, the solubility means a solubility of the polymer whose salt-forming groups are neutralized completely (i.e., 100%) with acetic acid or sodium hydroxide according to kinds of the salt-forming groups.

Examples of the water-insoluble polymers used in the present invention include polyesters, polyurethanes and vinyl polymers. Among these polymers, preferred are vinyl polymers obtained by addition-polymerizing vinyl monomers such as vinyl compounds, vinylidene compounds and vinylene compounds in view of a good dispersion stability thereof.

(Vinyl Polymer)

The vinyl polymer used in the present invention is preferably a water-insoluble vinyl polymer which is produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)") (such a mixture is hereinafter occasionally referred to merely as a "monomer mixture"). The water-insoluble vinyl polymer contains a constitutional unit derived from the component (a) and a constitutional unit derived from the component (b), and/or a constitutional unit derived from the component (c). The water-insoluble vinyl polymer is more preferably a water-insoluble graft polymer containing the constitutional unit derived from the component (a) or the constitutional units derived from the components (a) and (c) as a main chain, and the constitutional unit derived from the component (b) as a side chain.

The salt-forming group-containing monomer (a) is used for enhancing a dispersion stability of the resultant water dispersion. Examples of the salt-forming group include a carboxyl group, a sulfonic group, a phosphoric group, an amino group and an ammonium group.

Examples of the salt-forming group-containing monomers include cationic monomers and anionic monomers as described in paragraph [0022], etc., of JP 9-286939A.

Typical examples of the cationic monomers include unsaturated amine-containing monomers and unsaturated ammonium salt-containing monomers. Among these cationic monomers, preferred are N,N-dimethylaminoethyl (meth) acrylate, N—(N',N'-dimethylaminopropyl) (meth)acrylate and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

The macromer (b) is used for enhancing a dispersion stability of the pigment-containing polymer particles. The macromer (b) is in the form of a monomer containing a polymerizable unsaturated group which has a number-average molecular weight of from 500 to 100,000 and preferably from 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability of the pigment-containing polymer particles, etc., preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are preferably used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, or an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth) acrylates, preferred is benzyl (meth) acrylate.

The polymerizable functional group bonded to one terminal end of these macromers is preferably an acryloyloxy group or a methacryloyloxy group. Examples of the other monomers copolymerizable with the aromatic group-containing (meth)acrylate include acrylonitrile.

The content of the constitutional unit derived from the styrene-based monomer in the styrene-based macromer or the content of the constitutional unit derived from the aromatic group-containing (meth)acrylate in the aromatic group-containing (meth)acrylate-based macromer is preferably 50% by weight or more and more preferably 70% by weight or more in view of enhancing an affinity to pigments.

The macromer (b) may further contain side chains composed of other constitutional units derived from an organopolysiloxane, etc. Such a side chain may be produced, for example, by copolymerizing with the macromer, a silicone-based macromer having a polymerizable functional group at one terminal end thereof which is represented by the following general formula (3):

$$CH_2=C(CH_3)-COOC_3H_6-[Si(CH_3)_2-O]_t-Si(CH_3)_3 \quad (3)$$

wherein t is a number of from 8 to 40.

The styrene-based macromer as the component (b) is commercially available, for example, from Toagosei Co., Ltd., as product names of AS-6(S), AN-6(S), HS-6(S), etc.

The hydrophobic monomer (c) is used for enhancing an optical density of the resultant ink. Examples of the hydrophobic monomer include alkyl (meth)acrylates and aromatic group-containing monomers.

The preferred alkyl (meth)acrylates are those containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth) acrylate, cyclohexyl (meth) acrylate, 2-ethylhexyl (meth) acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). and the "(meth) acrylate" means acrylate, methacrylate or both thereof.

The aromatic group-containing monomer may contain a substituent group having a hetero atom, and is preferably a vinyl monomer containing an aromatic group having 6 to 22 carbon atoms, preferably 6 to 18 carbon atoms and more preferably 6 to 12 carbon atoms. Examples of the aromatic group-containing monomer include the above styrene-based monomer (component c-1), and the above aromatic group-containing (meth)acrylate (component c-2). Examples of the substituent group having a hetero atom include those exemplified previously.

Among these components (c), in view of enhancing an optical density, preferred is the styrene-based monomer (component c-1). Among these styrene-based monomers, especially preferred are styrene and 2-methyl styrene. The content of the component (c-1) in the component (c) is preferably from 10 to 100% by weight and more preferably from 20 to 80% by weight in view of enhancing an optical density.

Also, examples of the preferred aromatic group-containing (meth)acrylate as the component (c-2) include benzyl (meth) acrylate and phenoxyethyl (meth)acrylate. The content of the component (c-2) in the component (c) is preferably from 10 to 100% by weight and more preferably from 20 to 80% by weight in view of enhancing an optical density and a gloss. Further, the components (c-1) and (c-2) are preferably used in combination with each other.

The monomer mixture may further contain (d) a hydroxyl-containing monomer (hereinafter occasionally referred to merely as a "component (d)"). The hydroxyl-containing monomer (d) is used to exhibit an excellent effect of enhancing a dispersion stability of the polymer particles.

Examples of the component (d) include 2-hydroxyethyl (meth)acrylate, 3-hydroxypropyl (meth)acrylate, polyethylene glycol (n=2 to 30 wherein n represents an average molar number of addition of oxyalkylene groups: this definition is similarly applied to the following descriptions) (meth) acrylate, polypropylene glycol (n=2 to 30) (meth)acrylate, and poly(ethylene glycol (n=1 to 15)/propylene glycol (n=1 to 15) (meth)acrylate. Among these hydroxyl-containing monomers, preferred are 2-hydroxyethyl (meth)acrylate, polyethylene glycol mono-methacrylate and polypropylene glycol methacrylate.

The monomer mixture may further contain (e) a monomer (hereinafter occasionally referred to merely as a "component (e)") represented by the following general formula (4):

$$CH_2=C(R^1)COO(R^2O)_qR^3 \quad (4)$$

wherein $R^1$ is a hydrogen atom or a lower alkyl group having 1 to 5 carbon atoms; $R^2$ is a divalent hydrocarbon group having 1 to 30 carbon atoms which may contain a hetero atom; $R^3$ is a monovalent hydrocarbon group having 1 to 30 carbon atoms which may contain a hetero atom or a phenyl group which may contain an alkyl group having 1 to 9 carbon atoms; and q represents an average molar number of addition of $R^2O$ groups, and is a number of from 1 to 60 and preferably a number of from 1 to 30.

The component (e) is used to exhibit an excellent effect of enhancing an ejection property of the resultant ink.

Examples of the hetero atom which may be contained in the monomer of the general formula (4) include a nitrogen atom, an oxygen atom, a halogen atom and a sulfur atom.

Examples of the suitable $R^1$ group include methyl, ethyl and (iso)propyl.

Examples of the suitable $R^2O$ group include oxyethylene, oxytrimethylene, oxypropane-1,2-diyl, oxytetramethylene, oxyheptamethylene, oxyhexamethylene, and an oxyalkanediyl (oxyalkylene) group having 2 to 7 carbon atoms which is constituted from combination of at least two of these groups.

Examples of the suitable $R^3$ group include an aliphatic alkyl group having 1 to 30 carbon atoms, preferably 1 to 20 carbon atoms and more preferably 1 to 8 carbon atoms, an aromatic ring-containing alkyl group having 7 to 30 carbon atoms, a hetero ring-containing alkyl group having 4 to 30 carbon atoms, and a phenyl group which may contain an alkyl group having 1 to 8 carbon atoms.

Specific examples of the component (e) include methoxy polyethylene glycol (q in the general formula (4): 1 to 30; this definition is similarly applied to the following compounds) (meth)acrylate, methoxy polytetramethylene glycol (q=1 to 30) (meth)acrylate, ethoxy polyethylene glycol (q=1 to 30) (meth)acrylate, octoxy polyethylene glycol (q=1 to 30) (meth)acrylate, polyethylene glycol (q=1 to 30) (meth)acrylate 2-ethylhexyl ether, (iso)propoxy polyethylene glycol (q=1 to 30) (meth)acrylate, butoxy polyethylene glycol (q=1 to 30) (meth)acrylate, methoxy polypropylene glycol (q=1 to 30) (meth)acrylate, and methoxy (ethylene glycol/propylene glycol copolymer) (q=1 to 30: among which the number of ethylene glycol constitutional units is 1 to 29) (meth)acrylate. Among these compounds, preferred are octoxy polyethylene glycol (q=1 to 30) (meth)acrylate and polyethylene glycol (q=1 to 30) (meth)acrylate 2-ethylhexyl ether.

Examples of the commercially available components (d) and (e) include polyfunctional acrylate monomers (NK esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

These components (a) to (e) are respectively used alone or in the form of a mixture of any two or more thereof.

Upon production of the vinyl polymer, the contents of the above components (a) to (e) in the monomer mixture (contents of non-neutralized components; this definition is similarly applied to the following descriptions) or the contents of the constitutional units derived from the components (a) to (e) in the vinyl polymer are as follows.

The content of the component (a) is preferably from 2 to 40% by weight, more preferably from 2 to 30% by weight and still more preferably from 3 to 20% by weight in view of a good dispersion stability of the resultant water dispersion.

The content of the component (b) is preferably from 1 to 25% by weight and more preferably from 5 to 20% by weight, in particular, in view of enhancing an interaction with the pigment.

The content of the component (c) is preferably from 5 to 98% by weight and more preferably from 10 to 60% by weight in view of enhancing an optical density.

The content of the component (d) is preferably from 5 to 40% by weight and more preferably from 7 to 20% by weight in view of a good dispersion stability of the resultant water dispersion.

The content of the component (e) is preferably from 5 to 50% by weight and more preferably from 10 to 40% by weight in view of a good ejection property of the resultant ink.

The total content of the components (a) and (d) in the monomer mixture is preferably from 6 to 60% by weight and more preferably from 10 to 50% by weight in view of a good dispersion stability of the resultant water dispersion.

The total content of the components (a) and (e) in the monomer mixture is preferably from 6 to 75% by weight and more preferably from 13 to 50% by weight in view of a good dispersion stability of the resultant water dispersion and a good ejection property of the resultant ink. The total content of the components (a), (d) and (e) in the monomer mixture is preferably from 6 to 60% by weight and more preferably from 7 to 50% by weight in view of a good dispersion stability of the resultant water dispersion and a good ejection property of the resultant ink.

Also, the weight ratio of the component (a) to a sum of the components (b) and (c) [component (a)/(component (b)+component (c))] is preferably from 0.01 to 1, more preferably from 0.02 to 0.67 and still more preferably from 0.03 to 0.50 in view of a good dispersion stability and a good optical density of the resultant water dispersion.

(Production of Water-Insoluble Polymer)

The water-insoluble polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and therefore are not particularly limited. The polymerization is generally conducted at a temperature of preferably from 30 to 100° C. and more preferably from 50 to 80° C. for 1 to 20 h. Further, the polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the water-insoluble polymer used in the present invention is preferably from 5,000 to 500,000, more preferably from 10,000 to 400,000 and still more preferably from 10,000 to 300,000 in view of a good gloss and a good dispersion stability of the pigment therein. Meanwhile, the weight-average molecular weight of the water-insoluble polymer was measured by the method as described in Examples below.

When the water-insoluble vinyl polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is preferably from 10 to 200%, more preferably from 20 to 150% and still more preferably from 50 to 150%.

The degree of neutralization of the anionic salt-forming group is calculated according to the following formula:

[weight (g) of neutralizing agent/equivalent of neutralizing agent]/[acid value of polymer (KOH mg/g)×weight (g) of polymer/(56×1000)]×100

The degree of neutralization of the cationic salt-forming group is calculated according to the following formula:

[weight (g) of neutralizing agent/equivalent of neutralizing agent]/[amine value of polymer (HCl mg/g)×weight (g) of polymer/(36.5×1000)]×100

The acid value or amine value may be calculated from the respective constitutional units of the polymer, or may also be determined by the method of subjecting a solution prepared by dissolving the polymer in an appropriate solvent such as methyl ethyl ketone to titration.

(Crosslinkable Monomer Containing at Least Two Reactive Unsaturated Groups in a Molecule Thereof)

Examples of the crosslinkable monomer containing at least two reactive unsaturated groups in a molecule thereof (hereinafter referred to merely as a "crosslinkable monomer") include (1) (meth)acrylic ester compounds of polyhydric alcohols such as ethylene glycol di(meth)acrylate, diethylene glycol di(meth)acrylate, polyethylene glycol di(meth)acrylate, propylene glycol di(meth)acrylate, dipropylene glycol di(meth)acrylate, polypropylene glycol di(meth)acrylate, 1,2-butylene glycol di(meth)acrylate, 1,3-butylene glycol di(meth)acrylate, neopentyl glycol di(meth)acrylate, glycerol di(meth)acrylate, glycerol tri(meth)acrylate, trimethylol propane tri(meth)acrylate and pentaerythritol tetra(meth)acrylate; (2) acrylamide compounds such as N-methylallyl acrylamide, N-vinyl acrylamide, N,N'-methylenebis(meth)acrylamide and bisacrylamide acetate; (3) divinyl compounds such as divinyl benzene, divinyl ether and divinyl ethylene urea; and (4) polyallyl compounds such as diallyl phthalate, diallyl maleate, diallyl amine, triallyl amine, triallyl ammonium salts, allyl-etherified products of pentaerythritol and allyl-etherified products of sucrose containing at least two allyl ether units in a molecule thereof.

Among these crosslinkable monomers, preferred are ethylene glycol di(meth)acrylate, polyethylene glycol di(meth)acrylate, divinyl benzene, pentaerythritol triallyl ether, pentaerythritol tetraallyl ether and methylenebisacrylamide.

(Crosslinking Agent Containing at Least Two Reactive Functional Groups in a Molecule Thereof)

The crosslinking agent containing at least two reactive functional groups in a molecule thereof (hereinafter referred to merely as a "crosslinking agent") is used for crosslinking a shell portion of the core/shell polymer particles having a crosslinked core portion until reaching an appropriate crosslinking degree. The molecular weight of the crosslinking agent is preferably from 120 to 2000, more preferably from 150 to 1500 and still more preferably from 150 to 1000 in view of a facilitated reaction of the polymer and a good storage stability of the resultant crosslinked polymer particles.

The number of the reactive functional groups contained in the crosslinking agent is preferably from 2 to 4 and most preferably 2 in view of a well-controlled molecular weight of the resultant crosslinked polymer and a good gloss of the resultant dispersion and ink. The reactive functional groups are preferably one or more groups other than the above reactive unsaturated groups which are selected from the group consisting of a hydroxyl group, an epoxy group, an aldehyde group, an amino group, a carboxyl group and an oxazoline group.

The solubility of these crosslinking agent in 100 g of water is preferably 80 g or lower, more preferably 50 g or lower and still more preferably 30 g or lower as measured at 25° C. in view of allowing the polymer to be efficiently crosslinked at the surface thereof and enhancing a storage stability of the water dispersion.

Specific examples of the crosslinking agent include the following compounds (a) to (f).

(a) Compounds containing two or more hydroxyl groups in a molecule thereof:

Example of the compounds containing two or more hydroxyl groups in a molecule thereof include polyhydric alcohols such as ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanol amine, tridiethanol amine, polypropylene glycol, polyvinyl alcohol, pentaerythritol, sorbitol, sorbitan, glucose, mannitol, mannitan, sucrose and glucose.

(b) Compounds containing two or more epoxy groups in a molecule thereof:

Examples of the compounds containing two or more epoxy groups in a molecule thereof include polyglycidyl ethers such as ethylene glycol diglycidyl ether, polyethylene glycol diglycidyl ether, glycerol triglycidyl ether, polyglycerol polyglycidyl ether and trimethylol propane polyglycidyl ether.

(c) Compounds containing two or more aldehyde groups in a molecule thereof:

Examples of the compounds containing two or more aldehyde groups in a molecule thereof include polyaldehydes such as glutaraldehyde and glyoxal.

(d) Compounds containing two or more amino groups in a molecule thereof:

Examples of the compounds containing two or more amino groups in a molecule thereof include polyamines such as ethylenediamine and polyethyleneimine.

(e) Compounds containing two or more carboxyl groups in a molecule thereof:

Examples of the compounds containing two or more carboxyl groups in a molecule thereof include polycarboxylic acids such as oxalic acid, malonic acid, succinic acid, fumaric acid, maleic acid and adipic acid.

(f) Compounds containing two or more oxazoline groups in a molecule thereof:

Example of the compounds containing two or more oxazoline groups in a molecule thereof include compounds containing an aliphatic or aromatic group to which 2 or more and preferably from 2 to 3 oxazoline groups are bonded. Specific examples of such compounds include bisoxazoline compounds such as 2,2'-bis(2-oxazoline), 1,3-phenylenebisoxazoline and 1,3-benzobisoxazoline, and compounds containing oxazoline end groups which are obtained by reacting these compounds with a polybasic carboxylic acid.

Among these compounds, preferred are the compounds (b) containing two or more epoxy groups in a molecule thereof, and more preferred is trimethylol propane polyglycidyl ether.

In the core/shell polymer particles having the crosslinked core portion, the water-insoluble polymer forming the shell portion thereof contains a reactive group (crosslinkable functional group) capable of reacting with the crosslinking agent. The preferred combinations of the reactive group contained in the water-insoluble polymer and the crosslinking agent are as follows.

When the reactive group of the polymer forming the shell portion of the core/shell polymer particles is an acid group such as a carboxyl group, a sulfonic group and a phosphoric group, the crosslinking agent is preferably selected from the above compounds (a), (b), (d) and (f).

When the reactive group of the polymer forming the shell portion of the core/shell polymer particles is an amino group or a hydroxyl group, the crosslinking agent is preferably selected from the above compounds (b), (c) and (e).

When the reactive group of the polymer forming the shell portion of the core/shell polymer particles is an isocyanate group or an epoxy group, the crosslinking agent is preferably selected from the above compounds (a), (d) and (e).

Among the above combinations, in view of well controlling the crosslinking reaction to obtain a crosslinked polymer having an adequate crosslinking structure from the polymer forming the shell portion of the core/shell polymer particles, especially preferred is the combination of the polymer containing at least one reactive group selected from the group consisting of acid groups such as a carboxyl group, a sulfonic group and a phosphoric group, an amino group and a hydroxyl group, with the compound (b) containing two or more epoxy groups in a molecule thereof.

The polymer containing an acid group such as a carboxyl group, a sulfonic group and a phosphoric group, an amino group, a hydroxyl group, an isocyanate group, an epoxy group, etc., as the reactive group (crosslinkable functional group) capable of reacting with the above crosslinking agent may be produced by copolymerizing a polymerizable monomer composition containing a monomer having the above reactive group in the above procedure for producing the polymer.

As the polymer containing a salt-forming group such as an acid group and an amino group as the reactive group capable of reacting with the crosslinking agent, there may be used those polymers obtained by copolymerizing the above salt-forming group-containing monomer. Also, as the polymer containing a hydroxyl group as the reactive group capable of reacting with the crosslinking agent, there may be used those polymers obtained by copolymerizing the above hydroxyl group-containing monomer.

As the polymer containing an epoxy group as the reactive group, there may be used those polymers obtained by copolymerizing an epoxy group-containing monomer, more specifically, glycidyl (meth)acrylate. Further, as the polymer containing an isocyanate group as the reactive group, there may be used (i) those polymers obtained by copolymerizing an isocyanate group-containing monomer, for example, isocyanato-ethyl (meth)acrylate, and (ii) those polymers obtained by copolymerizing an isocyanate-terminated prepolymer produced from an unsaturated polyester polyol and an isocyanate.

(Water-Insoluble Organic Compound)

In the present invention, a water-insoluble organic compound may be used, specifically, may be incorporated into the crosslinked core/shell polymer particles, in order to improve a flexibility of the crosslinked core/shell polymer particles and enhance a gloss of the resultant printed images or characters. The water-insoluble organic compound may be added during or after the step for producing the pigment-containing polymer particles, or during or after the below-mentioned step for producing the crosslinked core/shell polymer particles.

The water-insoluble organic compound preferably has a molecular weight of from 100 to 2,000 and more preferably from 100 to 1,200 in view of enhancing a gloss of the resultant water-based ink.

The solubility of the water-insoluble organic compound in water is preferably 5 g or lower, more preferably 3 g or lower, still more preferably 1 g or lower and further still more preferably 0.5 g or lower per 100 g of water as measured at 20° C.

The water-insoluble organic compound preferably has a Log P value (logarithm of a 1-octanol/water partition coefficient of the water-insoluble organic compound) of from 4 to 16, more preferably from 5 to 16 and still more preferably from 6 to 15 in view of not only enhancing a gloss of printed images or characters formed on a coated paper but also improving a storage stability of the resultant water dispersion.

When using such a water-insoluble organic compound, the printed images or characters with a second color which are obtained by using an ink set of water-based inks having different colors from each other and each containing the crosslinked core/shell polymer particles, are excellent especially in gloss.

The water-insoluble organic compound is preferably in the form of an ester compound, an ether compound or a sulfonamide compound for facilitating inclusion of the water-insoluble organic compound in the (crosslinked) polymer particles. The water-insoluble organic compound is more preferably an ester or ether compound (x) containing two or more ester or ether bonds in a molecule thereof, and/or an ester or ether compound (y) containing one or more ester or ether bonds and one or more and preferably from 1 to 3 functional groups selected from the group consisting of a carboxyl group, a sulfonic group, a phosphoric acid residue, a carbonyl group, an epoxy group and a hydroxyl group in a molecule thereof. The number of the ester or ether bonds in the compound (x) is preferably from 2 to 3; and the number of the ester or ether bonds in the compound (y) is preferably from 1 to 3.

Among these ester compounds, preferred are esters produced from a monovalent carboxylic acid or a salt thereof, and a polyvalent alcohol, and esters produced from a polyvalent acid such as a polycarboxylic acid and phosphoric acid or a salt thereof, and a monovalent alcohol. Among these ether compounds, preferred are ethers of polyvalent alcohols. Examples of the salt include alkali metal salts, alkanol amine salts and ammonium salts.

Examples of the monovalent carboxylic acid include linear or branched aliphatic carboxylic acids having 1 to 18 carbon atoms and preferably 2 to 10 carbon atoms; and aromatic carboxylic acids having 6 to 12 carbon atoms such as, for example, benzoic acid. Examples of the polyvalent acid include aliphatic carboxylic acids having 2 to 12 carbon atoms such as maleic acid, fumaric acid, itaconic acid, succinic acid, adipic acid and sebacic acid; aromatic carboxylic acids having 6 to 12 carbon atoms such as phthalic acid and trimellitic acid; and phosphoric acids.

Examples of the monovalent alcohol include linear or branched aliphatic alcohols having 1 to 18 carbon atoms and preferably 2 to 10 carbon atoms such as, for example, ethyl alcohol, butyl alcohol, hexyl alcohol, octyl alcohol and dodecyl alcohol; aromatic alcohols having 6 to 12 carbon atoms such as, for example, phenol; and alkylene oxide compounds of these alcohols.

Examples of the polyvalent alcohol include those having 2 to 12 carbon atoms such as ethylene glycol, diethylene glycol, neopentyl glycol, trimethylol propane, pentaerythritol and glycerol; and alkylene oxide compounds of these alcohols. The aliphatic acids and alcohols used in the present invention may be either saturated or unsaturated.

Specific examples of the water-insoluble organic compound include those compounds obtained from the above carboxylic acids and the above alcohols such as (1) aliphatic carboxylic esters, (2) aromatic carboxylic esters, (3) cycloalkane (cycloalkene) carboxylic esters, (4) phosphoric esters, (5) oxyacid esters, (6) glycol esters, (7) epoxy-based esters, (8) sulfonamides, (9) polyesters, (10) glyceryl alkyl ethers, (11) glyceryl alkyl esters and (12) glycol alkyl ethers.

Among these compounds, in view of a good gloss of the resultant ink, preferred are the compounds (1) to (5), (8) and (10); more preferred are one or more compounds selected from the group consisting of (1) aliphatic carboxylic esters, (2) aromatic carboxylic esters, (3) cycloalkane (cycloalkene) carboxylic esters and (4) phosphoric esters; and still more preferred are one or more compounds selected from the group consisting of aliphatic dicarboxylic esters, aromatic di- or tri-carboxylic esters, cycloalkane (cycloalkene) dicarboxylic esters and phosphoric di- or tri-esters.

(Polymer Particles Containing a Pigment)

The polymer particles containing a pigment is used for suppressing occurrence of bronzing and enhancing a dispersion stability and an optical density of the pigment. The polymer particles containing a pigment (hereinafter referred to as the "pigment-containing polymer particles") may be produced, for example, by the following step:

Step: dispersing a mixture containing a polymer, an organic solvent, a pigment and water as well as a neutralizing agent, if required.

In the above step, preferably, the polymer is first dissolved in the organic solvent, and then the pigment and water together with optional components such as a neutralizing agent and a surfactant, if required, are added to the thus obtained organic solvent solution under mixing to obtain a dispersion of an oil-in-water type. The content of the pigment in the dispersion is preferably from 5 to 50% by weight. The content of the organic solvent in the dispersion is preferably from 10 to 70% by weight. The content of the polymer in the dispersion is preferably from 2 to 40% by weight, and the content of water in the dispersion is preferably from 10 to 70% by weight. When the polymer contains a salt-forming group, the neutralizing agent is preferably used in the dispersion. The polymer containing such a salt-forming group may be previously neutralized with the neutralizing agent. The degree of neutralization of the salt-forming group in the polymer with the neutralizing agent is not particularly limited. In general, the degree of neutralization is preferably controlled such that the finally obtained water dispersion exhibits a neutral liquid property, for example, a pH of from 4.5 to 10. The pH of the dispersion may also be determined from the desired degree of neutralization for the vinyl polymer.

Examples of the organic solvents include alcohol solvents, ketone solvents and ether solvents. Specific examples of the alcohol solvents include ethanol, isopropanol, n-butanol, tert-butanol, isobutanol and diacetone alcohol. Specific examples of the ketone solvents include acetone, methyl ethyl ketone, diethyl ketone and methyl isobutyl ketone. Specific examples of the ether solvents include dibutyl ether, tetrahydrofuran and dioxane.

The solubility of these organic solvent in 100 g of water is preferably 5 g or higher and more preferably 10 g or higher, more specifically, preferably from 5 to 80 g and more preferably from 10 to 50 g as measured at 20° C. Among these organic solvents, preferred are methyl ethyl ketone and methyl isobutyl ketone. These organic solvents may be used alone or in the form of a mixture of any two or more thereof.

As the neutralizing agent, there may be used acids or bases depending upon the kinds of salt-forming groups contained in the polymer. Examples of the neutralizing agent include those acids and bases as illustrated previously.

The method for dispersing the mixture in the above step is not particularly limited. Preferably, the mixture is first subjected to a preliminary dispersion procedure, and then to the substantial dispersion procedure by applying a shear stress thereto. In the above step, the polymer particles may be finely divided to obtain the polymer particles having a desired average particle size.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Iron Works. Co., Ltd., "Ebara Milder" (tradename: available from Ebara Corporation), "TK Homomixer", "TK Pipeline Mixer", "TK Homo Jetter", "TK Homomic Line Flow" and "Filmix" (tradenames: all available from Tokushu Kika Kogyo Co., Ltd.), "Clearmix" (tradename: available from M-Technic Co., Ltd.) and "K. D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). Among these apparatuses, the high-pressure homogenizers are preferred in view of reducing a particle size of the pigment contained in the mixture.

The water dispersion of the pigment-containing polymer particles obtained in the above step may be used for producing the crosslinked core/shell polymer particles of the present invention.

(Crosslinked Core/Shell Polymer Particles Containing a Pigment (hereinafter also referred to merely as the "pigment-containing crosslinked core/shell polymer particles"))

The crosslinked core/shell polymer particles of the present invention are preferably produced through the following steps (1) to (3) as described above:

Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;

Step (2): polymerizing the crosslinkable monomer with the hydrophobic monomer to obtain core/shell polymer particles having a crosslinked core portion; and Step (3): reacting the core/shell polymer particles having the crosslinked core portion which is obtained in the step (2), with a crosslinking agent containing at least two reactive functional groups in a molecule thereof.

In the step (1), first, the dispersion of the above pigment-containing polymer particles is subjected to mix with the crosslinkable monomer containing at least two reactive unsaturated groups in a molecule thereof, the hydrophobic monomer and water as well as a surfactant, etc., if required, to osmose and incorporate at least a part of the crosslinkable monomer and the hydrophobic monomer into the pigment-containing polymer particles. The method of dispersing the resultant mixture is not particularly limited. The dispersion of the step (1) is preferably conducted at a temperature of from 5 to 50° C. and more preferably from 10 to 35° C.

The mixing and stirring devices used for dispersing the mixture and the method of applying a shear stress to the dispersion may be the same as used for producing the above pigment-containing polymer particles.

The amount of the hydrophobic monomer used may be controlled such that the weight ratio of the hydrophobic monomer to the pigment-containing polymer particles (the hydrophobic monomer/the pigment-containing polymer particles) is preferably from 0.1 to 1 and more preferably from 0.2 to 0.5, in view of enhancing an optical density and a gloss of the resultant dispersion and suppressing occurrence of bronzing.

The crosslinkable monomer containing at least two reactive unsaturated groups in a molecule thereof, is used in an amount of from 0.5 to 15 parts by weight, preferably from 0.7 to 13 parts by weight, more preferably from 1.0 to 11 parts by weight and still more preferably from 1.5 to 9 parts by weight on the basis of 100 parts by weight of the total amount of the hydrophobic monomer and the crosslinkable monomer, in view of enhancing an optical density and a gloss of the resultant dispersion and suppressing occurrence of bronzing.

In the step (2), the crosslinkable monomer and the hydrophobic monomer contained in the resultant dispersion are polymerized with each other to obtain a dispersion of core/shell polymer particles having a crosslinked core portion. The initiator for the polymerization may be added either during or after the step (1). As the polymerization initiator, there may be used those as described previously. The polymerization reaction time is preferably from 0.5 to 10 h and more preferably from 1 to 5 h, and the polymerization reaction temperature is preferably from 40 to 95° C.

The core/shell polymer particles obtained in the step (2) have a core portion formed by crosslinking the polymer containing a constitutional unit derived from the hydrophobic monomer with the crosslinkable monomer, and a shell portion made of a polymer derived from the pigment-containing polymer. The polymer forming the shell portion is preferably a polymer obtained by copolymerizing the monomer mixture containing the salt-forming group-containing monomer (a) and the macromer (b), and/or the hydrophobic monomer (c) as described above.

The organic solvent is removed from the thus obtained dispersion to render the dispersion aqueous, thereby obtaining a water dispersion of the core/shell polymer particles having the crosslinked core portion which contain the pigment having a desired average particle size. The organic solvent is preferably substantially completely removed from the thus obtained water dispersion of the polymer particles. However, the residual organic solvent may be present in the water dispersion unless the objects and effects of the present invention are adversely affected by the residual organic solvent. The removal of the organic solvent from the water dispersion may be conducted by ordinary methods using distillation under reduced pressure, etc. The content of the residual organic solvent in the resultant water dispersion is preferably 0.1% by weight or lower and more preferably 0.01% by weight or lower. The organic solvent may be removed after completing the step (2) or during the step (3).

In the step (3), the core/shell polymer particles having the crosslinked core portion which are obtained in the step (2) are reacted with the crosslinking agent containing at least two reactive functional groups in a molecule thereof to obtain the crosslinked core/shell polymer particles. Specifically, in the step (3), the polymer forming the shell portion is crosslinked with the crosslinking agent containing at least two reactive functional groups in a molecule thereof, thereby obtaining the crosslinked core/shell polymer particles whose core and shell portions both are crosslinked.

In view of a good crosslinking efficiency, there is preferably used the method of mixing a water dispersion of the core/shell polymer particles having the crosslinked core portion which are obtained in the step (2) with the crosslinking agent containing at least two reactive functional groups in a molecule thereof to crosslink the polymer, thereby obtaining a water dispersion of the aimed crosslinked core/shell polymer particles. In this method, the polymer is preferably water-insoluble, and the solubility in water of the crosslinking agent preferably lies within the range as described above in view of attaining a good crosslinking efficiency and a good storage stability owing to surface crosslinking.

The catalyst, solvent, temperature and time used in the crosslinking reaction may be appropriately determined depending upon the crosslinking agent used therein. The crosslinking reaction time is preferably from 0.5 to 10 h and more preferably from 1 to 5 h. The crosslinking reaction temperature is preferably from 40 to 95° C.

The amount of the crosslinking agent containing at least two reactive functional groups in a molecule thereof which is used in the above crosslinking reaction is preferably from 0.5 to 15 parts by weight, more preferably from 0.7 to 13 parts by weight, still more preferably from 1.0 to 11 parts by weight and further still more preferably 1.5 to 9 parts by weight on the basis of 100 parts by weight of the polymer forming the shell portion of the core/shell polymer particles having the crosslinked core portion, namely the polymer of the pigment-containing polymer particles used in the step (1) in view of enhancing a gloss of the resultant polymer particles and suppressing occurrence of bronzing.

Further, from the same viewpoints as described above, the crosslinking agent is preferably used in an amount of from 0.1 to 10 parts by weight, more preferably from 0.3 to 8 parts by weight and still more preferably from 0.5 to 5 parts by weight on the basis of 100 parts by weight of the pigment-containing core/shell polymer particles having the crosslinked core portion.

The crosslinking rate (mol %) of the shell portion of the crosslinked core/shell polymer particles is preferably from 1 to 80 mol %, more preferably from 3 to 60 mol % and still more preferably from 5 to 50 mol % in view of a good gloss. The crosslinking rate (mol %) of the shell portion means the value calculated according to the following formula:

Crosslinking Rate (mol%)=[(number of molar equivalents of the crosslinking agent to be reacted with 1 mol of the polymer forming the shell portion)/ (number of moles of reactive groups capable of reacting with the crosslinking agent which are contained in the polymer forming the shell portion)×100]

The water dispersion of the thus obtained pigment-containing crosslinked core/shell polymer particles is preferably subjected to filtration to remove coarse particles therefrom. In the water dispersion of the pigment-containing crosslinked core/shell polymer particles, solid components made of the pigment-containing crosslinked core/shell polymer particles are dispersed in water as a main medium. The configuration of the pigment-containing crosslinked core/shell polymer particles is not particularly limited as long as the particles are formed from at least the pigment and the crosslinked core/shell polymer. Examples of the configuration of the polymer particles include the particle configuration in which the pigment is enclosed in the crosslinked core/shell polymer, the particle configuration in which the pigment is uniformly dispersed in the crosslinked core/shell polymer, and the particle configuration in which the pigment is exposed onto a surface of the respective crosslinked core/shell polymer particles.

[Process for Producing Crosslinked Polymer Particles Containing a Pigment (hereinafter referred to merely as "pigment-containing crosslinked polymer particles")]

The present invention provides the following process for producing the crosslinked polymer particles.

The process for producing pigment-containing crosslinked polymer particles, wherein a weight ratio of the pigment to the pigment-containing crosslinked polymer particles [(weight of the pigment/weight of the pigment-containing crosslinked polymer particles)×100] is from 25 to 75, includes the following steps (1) to (3):

Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;

Step (2): polymerizing the crosslinkable monomer with the hydrophobic monomer to obtain polymer particles; and Step (3): reacting the polymer particles which are obtained in the step (2) with a crosslinking agent containing at least two reactive functional groups in a molecule thereof.

The weight ratio of the pigment to the pigment-containing crosslinked polymer particles [(weight of the pigment/weight of the pigment-containing crosslinked polymer particles)×100] preferably lies within the same range as that of the above pigment-containing crosslinked core/shell polymer particles. In addition, the steps (1) to (3) are the same as those steps of the process for producing the pigment-containing crosslinked core/shell polymer particles, and the preferred ranges for the steps (1) to (3) are also the same as those used therein.

(Water Dispersion Containing Pigment-Containing Crosslinked Core/Shell Polymer Particles or Pigment-Containing Crosslinked Polymer Particles (hereinafter referred to merely as "pigment-containing crosslinked core/shell polymer particles or the like"), and Water-Based Ink)

The water dispersion of the present invention is produced by dispersing the pigment-containing crosslinked core/shell polymer particles or the like obtained by the above method in water.

The water-based ink of the present invention contains the above water dispersion of the present invention, and is in the form of an ink containing water as a main medium. The water-based ink may also contain, if required, various additives such as wetting agents, dispersants, defoaming agents, mildew-proof agents and chelating agents. The method of mixing these respective components is not particularly limited.

The contents of the pigment-containing crosslinked core/shell polymer particles or the like, the water-insoluble organic polymer and water in the water dispersion and the water-based ink for ink-jet printing are as follows in view of enhancing a gloss thereof and suppressing occurrence of bronzing.

The content of the pigment-containing crosslinked core/shell polymer particles or the like in the water dispersion and the water-based ink for ink-jet printing is preferably from 1 to 15% by weight, more preferably from 2 to 12% by weight and still more preferably from 2 to 10% by weight.

The weight ratio of the core portion to the shell portion of the pigment-containing crosslinked core/shell polymer particles (core portion/shell portion) is preferably from 0.3 to 3, more preferably from 0.3 to 2, still more preferably from 0.5 to 1.5 and further still more preferably from 0.7 to 1.3 in view of a good optical density and a good gloss of the water dispersion and the water-based ink. Upon calculating the weight ratio of the core portion to the shell portion, the weight of the crosslinking agent is involved in the weights of the respective portions.

The content of the water-insoluble organic compound in the water dispersion and the water-based ink for ink-jet printing is preferably from 0.1 to 5% by weight, more preferably from 0.2 to 4% by weight and still more preferably from 0.3 to 3% by weight.

The content of water in the water dispersion and the water-based ink for ink-jet printing is preferably from 30 to 90% by weight and more preferably from 40 to 80% by weight.

The average particle size of the pigment-containing crosslinked core/shell polymer particles or the like contained in the resultant water dispersion and water-based ink is preferably from 40 to 150 nm, more preferably from 45 to 120 nm and still more preferably from 50 to 100 nm in view of enhancing a gloss thereof and suppressing occurrence of bronzing. Meanwhile, the average particle size may be measured by the method described in the below-mentioned Examples.

The surface tension of the water dispersion of the present invention is preferably from 30 to 70 mN/m and more preferably from 35 to 68 mN/m as measured at 20° C., and the surface tension of the water-based ink of the present invention is preferably from 25 to 50 mN/m and more preferably from 27 to 45 mN/m as measured at 20° C.

The viscosity of the water dispersion of the present invention which has a solid content of 10% by weight is preferably from 2 to 6 mPa·s and more preferably from 2 to 5 mPa·s as measured at 20° C. to produce a water-based ink having a suitable viscosity, whereas the viscosity of the water-based ink of the present invention is preferably from 2 to 12 mPa·s and more preferably from 2.5 to 10 mPa·s as measured at 20° C. in view of maintaining a good ejection property thereof. Also, the pH value of the water-based ink is preferably from 4 to 10.

The water-based ink for ink-jet printing according to the present invention can provide printed images or characters having a high gloss when printed on a coated paper. Examples of the coated paper include photographic papers for ink-jet printing which include a void-type glossy medium having a 60° gloss of from 10 to 45. Here, the "gloss" value may be measured by the method described in Examples below. Such photographic papers are commercially available. Examples of the suitable commercially available photographic papers include "KA450PSK (tradename)" available from Seiko Epson Co., Ltd., etc.

The ink-jet printing method using the water-based ink of the present invention is not particularly limited, and is suitably applied, in particular, to piezoelectric-type ink-jet printers.

EXAMPLES

In the following production examples, examples and comparative examples, the "part(s)" and "%" indicate "part(s) by weight" and "% by weight", respectively, unless otherwise specified.

Production Example 1

Production of Water-Insoluble Polymer

Twenty parts of methyl ethyl ketone and 0.03 part of a chain transfer agent (2-mercaptoethanol) together with 10% of 200 parts of respective monomers shown in Table 1 were charged into a reaction vessel and mixed with each other, and then the reaction vessel was fully purged with a nitrogen gas to thereby obtain a mixed solution.

Separately, remaining 90% of the monomers shown in Table 1 were charged into a dropping funnel, and further 0.27 part of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping while maintaining the temperature at 65° C., a solution prepared by dissolving 0.3 part of the radical polymerization initiator in 5 parts of methyl ethyl ketone was added to the mixed solution, and the resultant reaction solution was further aged at 65° C. for 2 h and further at 70° C. for 2 h, thereby obtaining a polymer solution.

The weight-average molecular weight of the thus obtained polymer was measured by the above method. The results are shown in Table 1.

Meanwhile, details of the respective compounds shown in Table 1 are as follows.

Styrene Macromer: "AS-6S" (tradename) available from Toagosei Co., Ltd., (50% toluene solution; solid content: 15 parts); number-average molecular weight: 6000; polymerizable functional group: methacryloyloxy group Polyethylene glycol monomethacrylate (average molar number of addition of ethyleneoxide: 9; end group: methyl); "NK-ESTER M-90G" (tradename) available from Shin-Nakamura Kagaku Kogyo Co., Ltd.

Polypropylene glycol monomethacrylate (average molar number of addition of propyleneoxide: 9; end group: hydroxyl); "BLEMMER PP-500" (tradename) available from NOF Corporation.

TABLE 1

| Kind of monomer (weight part(s) of solid component:) | Production Example 1 |
|---|---|
| (a) Methacrylic acid | 12 |
| (b) Styrene macromer (solid content) | 10 |
| (c) Benzyl methacrylate | 38 |
| (c) Stearyl methacrylate | 10 |
| (d) Polyethylene glycol monomethacrylate | 15 |
| (d) Polypropylene glycol monomethacrylate | 15 |
| Weight average molecular weight | 180,000 |

Example 1

Production of Dispersion 1 of Pigment-Containing Crosslinked Core/Shell Polymer Particles <Production of Base Dispersion 1>

Sixty eight parts of the polymer produced by drying the polymer solution obtained in Production Example 1 under reduced pressure was dissolved in 281 parts of methyl ethyl ketone. Further, 12.4 parts of a neutralizing agent 1 (a 5N sodium hydroxide aqueous solution), 6.5 parts of a neutralizing agent 2 (a 25% ammonia aqueous solution) and 975 parts of ion-exchanged water were added to the resultant solution to neutralize a salt-forming group of the polymer (degree of neutralization: 55% for the neutralizing agent 1 and 100% for the neutralizing agent 2). Next, 157 parts of a copper phthalocyanine-based pigment (CA. Pigment Blue 15:3) was added into the reaction solution, and then dispersed at a peripheral speed of 15 m/s for 2 h using a Pico-Mill available from Asada Iron Works. Co., Ltd. The thus obtained mixture was further dispersed under a pressure of 150 MPa by passing through a dispersing apparatus "MICROFLUIDIZER" (tradename) available from Microfluidics Corp., 5 times.

<Reaction of Crosslinked Core Portion>

Two hundred parts of the thus obtained dispersion (solid content: 14%) was mixed with a solution prepared by mixing 9.3 parts of styrene, 0.49 part of divinyl benzene (purity: 81%; "DVB-810 (tradename)" available from Shin-Nittetsu Chemical Corp.) and 0.2 part of a radical polymerization initiator (2,2'-azobis(2,4-dimethylvaleronitrile)) with each other, and the resultant mixture was dispersed at 20° C. for 1 h using a disper blade. The thus obtained mixture was further dispersed under a pressure of 150 MPa by passing through a dispersing apparatus "MICROFLUIDIZER" (tradename) available from Microfluidics Corp., 5 times.

The resultant dispersion was charged into a reaction vessel in a nitrogen atmosphere and reacted while stirring at 77° C. for 3 h, thereby obtaining a dispersion of pigment-containing particles having a crosslinked core portion.

<Treatment of Dispersion>

The resultant dispersion was kept under reduced pressure at 60° C. to remove methyl ethyl ketone therefrom, followed by removing a part of water therefrom. The obtained mixture was filtered through a 5 μm-mesh filter (acetyl cellulose membrane; outer diameter: 2.5 cm; available from Fujifilm Corporation) fitted to a 25 mL syringe without a needle available from Terumo Corporation, to remove coarse particles therefrom, thereby obtaining a water dispersion of pigment-containing water-insoluble polymer particles having a solid content of 22%.

<Crosslinking Reaction of Shell Portion>

Two hundred parts of the resultant dispersion (content of the polymer forming the shell portion: 9.8 parts) was charged into a reaction vessel under a nitrogen atmosphere. Further, 0.40 part of a crosslinking agent "DENACOL EX-321" (trimethylol propane polyglycidyl ether; epoxy equivalent: 140; the solubility in 100 g of water: about 27 g at 25° C.) available from Nagase ChemteX Corporation and 47.4 parts of ion-exchanged water were added to the reaction vessel. The contents of the reaction vessel were reacted with each other while stirring at 90° C. for 1.5 h, followed by controlling a concentration of the reaction solution by adding ion-exchanged water thereto, thereby obtaining a 20% dispersion of pigment-containing polymer particles having a crosslinked shell portion (crosslinking rate: 17.8 mol %).

<Production of Ink>

Next, 31.26 parts of the thus obtained water dispersion of the pigment-containing vinyl polymer particles was mixed with 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK and 50.44 parts of ion-exchanged water, and the resultant mixed solution was filtered through a 1.2 μm-mesh filter (acetyl cellulose membrane; outer diameter: 2.5 cm; available from Fujifilm Corporation) fitted to a 25 mL syringe without a needle to remove coarse particles therefrom, thereby obtaining a water-based ink as shown in Table 2.

Meanwhile, the measurement of the average particle size and the calculation of the crosslinking rate were made according to the following methods.

(1) Average Particle Size

The average particle size was measured by using a laser particle analyzing system "ELS-8000" (cumulant analysis) available from Otsuka Denshi Co., Ltd. The measurement was conducted at a temperature of 25° C., an angle between incident light and detector of 90° and a cumulative frequency of 100 times, and a refractive index of water (1.333) was input to the analyzing system as a refractive index of the dispersing medium. The concentration of the water dispersion or the water-based ink to be measured was usually about $5 \times 10^{-3}$% by weight.

(2) Calculation of Crosslinking Rate

The crosslinking rate (mol %) of the shell portion was calculated according to the following formula:

Crosslinking Rate (mol %)=[(number of molar equivalents of the crosslinking agent to be reacted with 1 mol of the polymer forming the shell portion)/(number of moles of reactive groups capable of reacting with the crosslinking agent which are contained in 1 mol of the polymer forming the shell portion)×100]

In Example 1, 0.40 part of the crosslinking agent "DENACOL EX-321" (epoxy equivalent: 140) was reacted with 9.8 parts of the polymer forming the shell portion. Therefore, the number of molar equivalents of the crosslinking agent to be reacted with 1 mol of the polymer having a weight-average molecular weight of 180,000 was calculated as follows:

(0.40/140)/(9.8/180000)=52.4.

Here, since the crosslinking agent "DENACOL EX-321" is reacted with a carboxyl group and a hydroxyl group, the number of moles of the reactive groups contained in 1 mol of the water-insoluble polymer which are capable of reacting with the crosslinking agent is equal to a total number of moles of methacrylic acid (molecular weight: 86) and polypropylene glycol monomethacrylate "PP-500" (molecular weight: 612) contained in 1 mol of the water-insoluble polymer, i.e., calculated as follows:

180000×0.12/86+180000×0.15/612=295 mol.

Accordingly, the crosslinking rate of the shell portion is calculated as follows:

52.4×100/295=17.8(mol %).

Example 2

Production of Dispersion 2 of Pigment-Containing Crosslinked Core/Shell Polymer Particles <Production of Base Dispersion 2>

Fifty eight parts of the polymer produced by drying the polymer solution obtained in Production Example 1 under reduced pressure was dissolved in 281 parts of methyl ethyl ketone. Further, 10.6 parts of a neutralizing agent 1 (a 5N sodium hydroxide aqueous solution), 5.6 parts of a neutralizing agent 2 (a 25% ammonia aqueous solution) and 978 parts of ion-exchanged water were added to the resultant solution to neutralize a salt-forming group of the polymer (degree of neutralization: 55% for the neutralizing agent 1 and 100% for the neutralizing agent 2). Next, 167 parts of a copper phthalocyanine-based pigment (CI. Pigment Blue 15:3) was added into the reaction solution, and then dispersed at a peripheral speed of 15 m/s for 2 h using a Pico-Mill available from Asada Iron Works. Co., Ltd. The thus obtained mixture was further dispersed under a pressure of 150 MPa by passing through a dispersing apparatus "MICROFLUIDIZER" (tradename) available from Microfluidics Corp., 5 times.

<Reaction of Crosslinked Core Portion>

Two hundred parts of the thus obtained dispersion (solid content: 14%) was mixed with a solution prepared by mixing 6.15 parts of styrene, 0.32 part of divinyl benzene (purity: 81%; "DVB-810 (tradename)" available from Shin-Nittetsu Chemical Corp.) and 0.13 part of a radical polymerization initiator (2,2'-azobis(2,4-dimethylvaleronitrile)) with each other, and the resultant mixture was dispersed at 20° C. for 1 h using a disper blade. The thus obtained mixture was further dispersed under a pressure of 150 MPa by passing through a dispersing apparatus "MICROFLUIDIZER" (tradename) available from Microfluidics Corp., 5 times.

The resultant dispersion was charged into a reaction vessel under a nitrogen atmosphere and reacted while stirring at 77° C. for 3 h, thereby obtaining a dispersion of pigment-containing particles having a crosslinked core portion.

<Treatment of Dispersion>

The resultant dispersion was kept under reduced pressure at 60° C. to remove methyl ethyl ketone therefrom, followed by removing a part of water therefrom. The obtained mixture was filtered through a 5 μm-mesh filter (acetyl cellulose membrane; outer diameter: 2.5 cm; available from Fujifilm Corporation) fitted to a 25 mL syringe without a needle available from Terumo Corporation, to remove coarse particles therefrom, thereby obtaining a water dispersion of pigment-containing graft polymer particles having a solid content of 21%.

<Crosslinking Reaction of Shell Portion>

Two hundred parts of the resultant dispersion (content of the polymer forming the shell portion: 8.9 parts) was charged into a reaction vessel under a nitrogen atmosphere. Further, 0.69 part of a crosslinking agent "DENACOL EX-321" (trimethylol propane polyglycidyl ether; epoxy equivalent: 140) available from Nagase ChemteX Corporation and 34.1 parts of ion-exchanged water were added to the reaction vessel. The contents of the reaction vessel were reacted with each other while stirring at 90° C. for 1.5 h, followed by controlling a concentration of the reaction solution by adding ion-exchanged water thereto, thereby obtaining a 20% dispersion of pigment-containing polymer particles having a crosslinked shell portion.

The crosslinking rate (mol %) of the shell portion was calculated in the same manner as in Example 1.

<Preparation of Ink>

Next, 27.07 parts of the thus obtained water dispersion of the pigment-containing vinyl polymer particles having the crosslinked shell portion was mixed with 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK and 54.63 parts of ion-exchanged water, and the resultant mixed solution was filtered through a 1.2 μm-mesh filter (acetyl cellulose membrane; outer diameter: 2.5 cm; available from Fujifilm Corporation) fitted to a 25 mL syringe without a needle to remove coarse particles therefrom, thereby obtaining a water-based ink as shown in Table 2.

Example 3

Production of Dispersion 3 of Pigment-Containing Crosslinked Core/Shell Polymer Particles The same procedure as in Example 2 was repeated except for changing the amount of the crosslinking agent used for crosslinking reaction of the shell portion, thereby obtaining a 20% water dispersion of pigment-containing vinyl polymer particles having a crosslinked shell portion.

Next, 26.86 parts of the thus obtained water dispersion of the pigment-containing vinyl polymer particles having the crosslinked shell portion was mixed under stirring with 0.30 part of a water-insoluble organic compound [composed of (i) 25 parts of a diester of phthalic acid and an ethyleneoxide adduct of 2-ethylhexyl alcohol "NEW-COHOL 1004 (tradename)" (average molar number of addition: 4) available from Nippon Emulsifier Co., Ltd., and (ii) 75 parts of a triester of trimellitic acid and an ethyleneoxide adduct of lauryl alcohol (average molar number of addition: 4) available from Nippon Emulsifier Co., Ltd.] to incorporate the water-insoluble organic compound into the polymer particles. The resultant mixed solution was mixed with 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK and 54.54 parts of ion-exchanged water, and the resultant mixed solution was filtered through a 1.2 μm-mesh filter (acetyl cellulose membrane; outer diameter: 2.5 cm; available from Fujifilm Corporation) fitted to a 25 mL syringe without a needle to remove coarse particles therefrom, thereby obtaining a water-based ink as shown in Table 2.

Example 4

Production of Dispersion 4 of Pigment-Containing Crosslinked Core/Shell Polymer Particles Two hundred parts of the base dispersion 1 (solid content: 14%) used in Example 1 was mixed with a solution prepared by mixing 7.0 parts of styrene and 0.37 part of divinyl benzene (purity: 81%; "DVB-810 (tradename)" available from Shin-Nittetsu Chemical Corp.) with each other, and the resultant mixture was dispersed at 20° C. for 1 h using a disper blade. The thus obtained mixture was further dispersed under a pressure of 150 MPa by passing through a dispersing apparatus "MICROFLUIDIZER" (tradename) available from Microfluidics Corp., 5 times.

The resultant dispersion was charged into a reaction vessel under a nitrogen atmosphere, and then 0.15 part of a radical polymerization initiator (potassium persulfate) was added to the reaction vessel. The contents of the reaction vessel were reacted with each other while stirring at 77° C. for 3 h, thereby obtaining a dispersion of pigment-containing particles having a crosslinked core portion.
<Treatment of Dispersion>

The same treatment as in Example 1 was repeated, thereby obtaining a water dispersion of pigment-containing water-insoluble polymer particles having a solid content of 22%.
<Crosslinking Reaction of Shell Portion>

Two hundred parts of the resultant dispersion (content of the polymer forming the shell portion: 10.4 parts) was charged into a reaction vessel under a nitrogen atmosphere. Further, 0.43 part of a crosslinking agent "DENACOL EX-321" (trimethylol propane polyglycidyl ether; epoxy equivalent: 140) available from Nagase ChemteX Corporation and 43.5 parts of ion-exchanged water were added to the reaction vessel. The contents of the reaction vessel were reacted with each other while stirring at 90° C. for 1.5 h, followed by controlling a concentration of the reaction solution by adding ion-exchanged water thereto, thereby obtaining a 20% dispersion of pigment-containing polymer particles having a crosslinked shell portion (crosslinking rate: 17.8 mol %).

<Production of Ink>

Next, 29.28 parts of the thus obtained water dispersion of the pigment-containing vinyl polymer particles was mixed under stirring with 0.30 part of a water-insoluble organic compound [composed of (i) 25 parts of a diester of phthalic acid and an ethyleneoxide adduct of 2-ethylhexyl alcohol "NEW-COHOL 1004 (tradename)" (average molar number of addition: 4) available from Nippon Emulsifier Co., Ltd., and (ii) 75 parts of a triester of trimellitic acid and an ethyleneoxide adduct of lauryl alcohol (average molar number of addition: 4) available from Nippon Emulsifier Co., Ltd.] to incorporate the water-insoluble organic compound into the polymer particles. The thus obtained mixed solution was mixed with 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK and 52.12 parts of ion-exchanged water, and the resultant mixed solution was filtered through a 1.2 μm-mesh filter (acetyl cellulose membrane; outer diameter: 2.5 cm; available from Fujifilm Corporation) fitted to a 25 mL syringe without a needle to remove coarse particles therefrom, thereby obtaining a water-based ink as shown in Table 2.

Example 5

Production of Dispersion 5 of Pigment-Containing Crosslinked Core/Shell Polymer Particles Two hundred twenty parts of the base dispersion 1 (solid content: 14%) used in Example 1 was mixed with a solution prepared by mixing 9.86 parts of styrene, 1.10 parts of divinyl benzene and 0.22 part of a radical polymerization initiator (2,2'-azobis(2,4-dimethylvaleronitrile)) with each other, and the resultant mixture was dispersed at 20° C. for 1 h using a disper blade. The thus obtained mixture was further dispersed under a pressure of 150 MPa by passing through a dispersing apparatus "MICROFLUIDIZER" (tradename) available from Microfluidics Corp., 5 times.

The resultant dispersion was charged into a reaction vessel under a nitrogen atmosphere, and then the contents of the reaction vessel were reacted with each other while stirring at 77° C. for 3 h, thereby obtaining a dispersion of pigment-containing particles having a crosslinked core portion.
<Treatment of Dispersion>

The same treatment as in Example 1 was repeated, thereby obtaining a water dispersion of pigment-containing water-insoluble polymer particles having a solid content of 22%.
<Crosslinking Reaction of Shell Portion>

Two hundred parts of the resultant dispersion was charged into a reaction vessel under a nitrogen atmosphere. Further, 0.20 part of a crosslinking agent "DENACOL EX-321" (trimethylol propane polyglycidyl ether; epoxy equivalent: 140) available from Nagase ChemteX Corporation and 47.4 parts of ion-exchanged water were added to the reaction vessel. The contents of the reaction vessel were reacted with each other while stirring at 90° C. for 1.5 h, followed by controlling a concentration of the reaction solution by adding ion-exchanged water thereto, thereby obtaining a 20% dispersion of pigment-containing polymer particles having a crosslinked shell portion.
<Production of Ink>

Next, 29.3 parts of the thus obtained water dispersion of the pigment-containing vinyl polymer particles was mixed under stirring with 0.30 part of a water-insoluble organic compound [composed of (i) 25 parts of a diester of phthalic acid and an ethyleneoxide adduct of 2-ethylhexyl alcohol "NEW-COHOL 1004 (tradename)" (average molar number of addition: 4) available from Nippon Emulsifier Co., Ltd., and (ii) 75 parts of a triester of trimellitic acid and an ethyleneoxide adduct of lauryl alcohol (average molar number of addition: 4) available from Nippon Emulsifier Co., Ltd.] to incorporate the water-insoluble organic compound into the polymer particles. The thus obtained mixed solution was mixed with 10 parts of glycerol, 7 parts of triethylene glycol monobutyl ether (TEGMBE), 1 part of "SURFYNOL 465" available from Nissin Chemical Industry Co., Ltd., 0.3 part of "Ploxel XL2" available from Avecia KK and 52.12 parts of ion-exchanged water, and the resultant mixed solution was filtered through a 1.2 μm-mesh filter (acetyl cellulose membrane; outer diameter: 2.5 cm; available from Fujifilm Corporation) fitted to a 25 mL syringe without a needle to remove coarse particles therefrom, thereby obtaining a water-based ink as shown in Table 2.

Comparative Example 1

The same procedure as in Example 1 was repeated except for using no core portion.

Comparative Example 2

The same procedure as in Example 1 was repeated except for using no divinyl benzene as the crosslinking agent upon subjecting the core portion to crosslinking reaction.

Comparative Example 3

The same procedure as in Example 1 was repeated except for subjecting the shell portion to no crosslinking reaction.

Next, the respective water-based inks obtained in Examples 1 to 5 and Comparative Examples 1 to 3 were subjected to the following tests to evaluate a gloss thereof and occurrence of bronzing thereon. The results are shown in Table 2.

(1) Gloss Test

Solid image printing was carried out on a coated paper (photographic paper <glossy> available from Seiko Epson Co., Ltd.) using an ink-jet printer "Model PX-A650" (piezoelectric type) commercially available from Seiko Epson Co., Ltd., under the following printing conditions:

Kind of Paper: EPSON Photo Printing Paper;
Printing Quality: Photo; and
Color set: No Color Correction After allowing the printed paper to stand at 25° C. for 24 h, the 20° gloss thereof was measured 5 times using a glossmeter "HANDY GLOSSMETER PG-1" (tradename) available from Nippon Denshoku Industries Co., Ltd., to obtain an average of the measured values.

Glossiness: 50 or more ◯: (high gloss)
Glossiness: 40 or more but less than 50 Δ: (slightly high gloss)
Glossiness: less than 40 x: (low gloss)

(2) Bronzing Test

After allowing the printed paper obtained under the same solid image printing conditions as used in the above gloss test (1) to stand at 25° C. for 24 h, the resultant solid image-printed paper was observed by naked eyes to evaluate occurrence of bronzing thereon.

◯: Reddish color was hardly recognized even upon solid image printing; most preferable;

Δ: Reddish color was hardly recognized even upon photographic printing, etc.; and X: Light of fluorescent lamp or sun light reflected on the printed surface looked reddish.

(3) Optical Density

Solid image printing was carried out on a plain paper "4024 (tradename)" available from Xerox Corp., using the above ink-jet printer under the following printing conditions:

Kind of Paper: Plain Paper
Mode set: Superfine.

After allowing the printed paper to stand at 25° C. for 24 h, the optical density thereof was measured 5 times using a Macbeth densitometer "RD914" (product number) available from Gretag-Macbeth Corp., to calculate an average of the measured values. The larger the average value, the higher the optical density became.

TABLE 2-1

|  | Examples | | | | |
| --- | --- | --- | --- | --- | --- |
|  | 1 | 2 | 3 | 4 | 5 |
| Water dispersion | | | | | |
| Pigment (part) *1 | 13.94 | 14.80 | 14.80 | 13.94 | 13.94 |
| Shell portion | | | | | |
| Amount of polymer (part) (a) *1 | 6.06 | 5.20 | 5.20 | 6.06 | 6.06 |
| Amount of crosslinkable monomer (part) (b) | 0.25 | 0.41 | 0.21 | 0.25 | 0.12 |
| (a) + (b) | 6.31 | 5.61 | 5.41 | 6.31 | 6.18 |
| Crosslinking degree (%) *2 | 4.1 | 7.9 | 4.1 | 4.1 | 2.05 |
| Crosslinking rate (%) | 17.8 | 33.8 | 17.8 | 17.8 | 8.9 |
| Core portion | | | | | |
| Amount of polymer (part) (c) *3 | 6.69 | 4.44 | 4.44 | 5.05 | 6.74 |
| Amount of crosslinking agent (part) (d) *4 | 0.29 | 0.19 | 0.19 | 0.22 | 0.59 |
| (c) + (d) | 6.98 | 4.63 | 4.63 | 5.27 | 7.33 |
| Crosslinking degree (%) *5 | 4.1 | 4.1 | 4.1 | 4.1 | 8.1 |
| Pigment-containing crosslinked core/shell polymer particles | | | | | |
| Weight ratio of core to shell (core/shell) | 1.11 | 0.83 | 0.86 | 0.84 | 1.19 |
| Introduction rate of pigment (%) *6 | 51.2 | 59.1 | 59.6 | 54.6 | 50.8 |
| Average particle size (nm) | 69 | 62 | 65 | 72 | 70 |
| Ink components (wt %) | | | | | |
| 20% Dispersion | 31.26 | 27.07 | 26.86 | 29.28 | 31.50 |
| Water-insoluble organic compound | 0.00 | 0.00 | 0.30 | 0.30 | 0.30 |
| Glycerol | 10.00 | 10.00 | 10.00 | 10.00 | 10.00 |
| TEGBME | 7.00 | 7.00 | 7.00 | 7.00 | 7.00 |
| SURFYNOL 465 | 1.00 | 1.00 | 1.00 | 1.00 | 1.00 |
| Ploxel XL2 | 0.30 | 0.30 | 0.30 | 0.30 | 0.30 |
| Ion-exchanged water | 50.44 | 54.63 | 54.54 | 52.12 | 49.90 |
| Evaluation results | | | | | |
| 20° Gloss | ◯ | ◯ | ◯ | ◯ | ◯ |
| Bronzing test (observed by naked eyes) | ◯ | ◯-Δ | ◯-Δ | ◯-Δ | ◯ |
| Optical density | 1.11 | 1.07 | 1.07 | 1.06 | 1.11 |

Note
*1 The amount of the polymer contained in the shell portion is expressed by the amount calculated assuming that a total amount of the pigment and the polymer contained in the shell portion is 20 parts by weight, and the amount of the polymer contained in the core portion is expressed on the basis of 20 parts by weight as the total amount of the pigment and the polymer of the shell portion.
*2 Crosslinking degree = (amount of the crosslinking agent/amount of the polymer contained in the shell portion) × 100
*3 The amount of the polymer contained in the core portion is a total amount of styrene and a monomer having one unsaturated group which is contained as an impurity in the crosslinking agent.
*4 The amount of the crosslinking agent is calculated in terms of the pure crosslinking agent.
*5 Crosslinking degree: (amount of the crosslinkable monomer/amount of the polymer contained in the crosslinked core portion) × 100
*6 Introduction rate of pigment (%) = (weight of the pigment/weight of the pigment-containing crosslinked core/shell polymer particles) × 100

TABLE 2-2

|  | Comparative Examples | | |
|---|---|---|---|
|  | 1 | 2 | 3 |
| Water dispersion | | | |
| Pigment (part) *1 | 13.94 | 13.94 | 13.94 |
| Shell portion | | | |
| Amount of polymer (part) (a) *1 | 6.06 | 6.06 | 6.06 |
| Amount of crosslinkable monomer (part) (b) | 0.25 | 0.25 | 0.00 |
| (a) + (b) | 6.31 | 6.31 | 6.06 |
| Crosslinking degree (%) *2 | 4.1 | 4.1 | 0.0 |
| Crosslinking rate (%) | 17.8 | 17.8 | 0.0 |
| Core portion | | | |
| Amount of polymer (part) (c) *3 | 0.00 | 6.63 | 6.69 |
| Amount of crosslinking agent (part) (d) *4 | 0.00 | 0.00 | 0.29 |
| (c) + (d) | 0 | 6.63 | 6.98 |
| Crosslinking degree (%) *5 | — | 0.0 | 4.1 |
| Pigment-containing crosslinked core/shell polymer particles | | | |
| Weight ratio of core to shell (core/shell) | 0.00 | 1.05 | 1.15 |
| Introduction rate of pigment (%) *6 | 68.8 | 51.9 | 51.7 |
| Average particle size (nm) | 75 | 75 | 70 |
| Ink components (wt %) | | | |
| 20% Dispersion | 23.24 | 30.86 | 30.97 |
| Water-insoluble organic compound | 0.00 | 0.00 | 0.30 |
| Glycerol | 10.00 | 10.00 | 10.00 |
| TEGBME | 7.00 | 7.00 | 7.00 |
| SURFYNOL 465 | 1.00 | 1.00 | 1.00 |
| Ploxel XL2 | 0.30 | 0.30 | 0.30 |
| Ion-exchanged water | 58.46 | 50.84 | 50.43 |
| Evaluation results | | | |
| 20° Gloss | X | Δ | Δ |
| Bronzing test (observed by naked eyes) | X | ○ | ○ |
| Optical density | 1.00 | 1.03 | 1.03 |

From the results shown in Table 2, it was confirmed that the water-based inks obtained in Examples 1 to 5 were excellent in optical density, gloss and suppression of bronzing as well as a balance therebetween as compared to those obtained in Comparative Examples 1 to 3.

INDUSTRIAL APPLICABILITY

The water-based ink for ink-jet printing which contains the crosslinked core/shell polymer particles of the present invention can exhibit an excellent optical density when printed on a plain paper, and can produce printed images or characters which are excellent in suppression of bronzing and gloss when printed on a coated paper.

What is claimed is:

1. A process for producing crosslinked core/shell polymer particles containing a pigment, wherein a weight ratio of the pigment to the pigment-containing crosslinked polymer particles [(weight of the pigment/weight of the pigment-containing crosslinked polymer particles)×100] is from 25 to 75, comprising the following steps (1) to (3):
    Step (1): mixing pigment-containing polymer particles, a crosslinkable monomer containing at least two reactive unsaturated groups in a molecule thereof, and a hydrophobic monomer with each other to incorporate at least a part of the crosslinkable monomer and the hydrophobic monomer into the pigment-containing polymer particles;
    Step (2): polymerizing the crosslinkable monomer with the hydrophobic monomer to obtain polymer particles; and
    Step (3): reacting the polymer particles which are obtained in the step (2), with a crosslinking agent containing at least two epoxy groups in a molecule thereof.

2. The process according to claim 1, wherein a shell portion of the crosslinked core/shell polymer particles has a crosslinking degree of from 0.5 to 15% by weight.

3. The process according to claim 1, wherein a core portion of the crosslinked core/shell polymer particles has a crosslinking degree of from 0.5 to 15% by weight.

4. The process according to claim 1, wherein a weight ratio of a core portion to a shell portion of the crosslinked core/shell polymer particles (core portion/shell portion) is from 0.3 to 3.

5. The process according to claim 1, wherein the pigment is a cyan pigment.

6. The process according to claim 1, wherein a weight ratio of a core portion to a shell portion of the crosslinked core/shell polymer particles (core portion/shell portion) is from 0.86 to 3.

7. The process according to claim 1, wherein a weight ratio of a core portion to a shell portion of the crosslinked core/shell polymer particles (core portion/shell portion) is from 1.05 to 3.

8. The process according to claim 1, wherein a weight ratio of a core portion to a shell portion of the crosslinked core/shell polymer particles (core portion/shell portion) is from 1.11 to 3.

9. The process according to claim 1, wherein a shell portion of the crosslinked core/shell polymer particles has a crosslinking degree of from 4.1 to 15% by weight.

10. The process according to claim 1, wherein a core portion of the crosslinked core/shell polymer particles has a crosslinking degree of from 4.1 to 15% by weight.

11. The process according to claim 1, wherein both a core portion and a shell portion of the crosslinked core/shell polymer particles have a crosslinking degree of from 4.1 to 15% by weight.

* * * * *